United States Patent [19]

Kalt et al.

[11] Patent Number: 5,795,488

[45] Date of Patent: Aug. 18, 1998

[54] PROCESS FOR TRANSPORTING A SOLUTION OF CELLULOSE IN AN AQUEOUS TERTIARY AMINE-OXIDE

[75] Inventors: Wolfram Kalt, Lenzing; Johann Männer, Weyregg; Heinrich Firgo, Vöcklabruck; Franz Schwenninger, Königsdorf, all of Austria

[73] Assignee: Lenzing Aktiengesellschaft, Lenzing, Austria

[21] Appl. No.: 715,763

[22] Filed: Sep. 19, 1996

[30] Foreign Application Priority Data

Sep. 26, 1995 [AT] Austria .................... 1596/95

[51] Int. Cl.⁶ .................... B01D 37/00; D01F 2/00
[52] U.S. Cl. .................... 210/767; 210/774; 264/187; 264/188; 264/203; 106/200.3
[58] Field of Search .................... 264/187, 203, 264/188, 186, 210.8, 561, 562; 210/767, 774; 106/166.01, 200.2, 200.3; 536/56, 57

[56] References Cited

U.S. PATENT DOCUMENTS

| | | | |
|---|---|---|---|
| 2,179,181 | 11/1939 | Graenacher et al. . | |
| 5,094,690 | 3/1992 | Zikeli et al. | 106/198 |
| 5,330,567 | 7/1994 | Zikeli et al. | 106/198 |
| 5,354,371 | 10/1994 | Wykes et al. | 106/198 |
| 5,358,143 | 10/1994 | Perry . | |
| 5,401,304 | 3/1995 | Wykes et al. | 106/203 |
| 5,409,532 | 4/1995 | Astegger et al. . | |
| 5,456,828 | 10/1995 | Tersi et al. . | |
| 5,484,539 | 1/1996 | Tersi et al. . | |
| 5,556,452 | 9/1996 | Kalt et al. | 106/166.01 |
| 5,584,919 | 12/1996 | Lee et al. | 264/186 |
| 5,601,767 | 2/1997 | Firgo et al. | 264/101 |
| 5,628,941 | 5/1997 | Kalt et al. | 264/38 |
| 5,656,224 | 8/1997 | Zikeli et al. | 264/207 |

FOREIGN PATENT DOCUMENTS

| | | |
|---|---|---|
| 553070 | 7/1993 | European Pat. Off. . |
| 652098 | 5/1995 | European Pat. Off. . |
| 553070 | 10/1996 | European Pat. Off. . |
| 9402408 | 2/1994 | WIPO . |

OTHER PUBLICATIONS

Buijtenhuijs et al., Das Papier, vol. 40, No. 12, pp. 615–619 (1986).

*Primary Examiner*—Robert Popovics
*Attorney, Agent, or Firm*—Baker & Botts LLP

[57] ABSTRACT

The invention is concerned with a process for transporting a solution of cellulose in an aqueous tertiary amine-oxide through a component wherein said cellulose solution has different flow rates in said component, characterized in that an outlet wherethrough part of said cellulose solution is discharged from said component is provided at a point within said component whereat said flow rate is relatively low. (FIG. 2)

4 Claims, 7 Drawing Sheets

PROCESS FOR TRANSPORTING A SOLUTION OF CELLULOSE IN AN AQUEOUS TERTIARY AMINE-OXIDE

BACKGROUND OF THE INVENTION

The invention is concerned with a process for transporting a solution of cellulose in an aqueous tertiary amine-oxide. Further, the invention is concerned with an arrangement for carrying out said process.

For the purposes of the present specification and claims, the term viscous mass or dope is used for a solution containing cellulose and an aqueous tertiary amine-oxide able to be processed to cellulose moulded bodies of any shape, particularly fibres and films. For the sake of simplicity, the production of the dope and its processing will be referred to in the following generally as amine-oxide process.

Tertiary amine-oxides have been known as alternative solvents for cellulose. It is known for instance from U.S. Pat. No. 2,179,181 that tertiary amine-oxides are capable of dissolving cellulose without derivatisation and that from these solutions cellulose moulded bodies, such as fibres, may be produced by precipitation. From EP-A - 0 553 070 of the applicant, further tertiary amine-oxides are known. In the following, all tertiary amine-oxides capable of dissolving cellulose are meant when, for the sake of simplicity, only NMMO (=N-methylmorpholine-N-oxide) is cited.

As alternative solvents, tertiary amine-oxides are advantageous insofar as cellulose is dissolved by the NMMO without derivatisation, contrary to the viscose process. Thus the cellulose does not have to be chemically regenerated, the NMMO remains chemically unchanged, passes during its precipitation into the precipitation bath and may be recovered from the latter and reused for the preparation of new solution. Therefore the NMMO process offers the possibility of a closed solvent cycle. Additionally, NMMO has an extremely low toxicity.

However, when cellulose is dissolved in NMMO, the polymerisation degree of the cellulose decreases. Moreover, particularly the presence of metal iones (such as $Fe^{3+}$) leads to radically initiated chain cleavages and thus to a significant degradation of the cellulose and the solvent (Buijtenhuijs et al.:The Degradation and Stabilization of Cellulose Dissolved in N-Methylmorpholin-N-Oxide (NMMO), in "Das Papier", Volume 40, number 12, pages 615–619, 1986).

On the other hand, amine-oxides generally have only a limited thermal stability which varies depending on their structure. Under normal conditions, the monohydrate of NMMO is present as a white crystalline solid, which melts at 72° C. Its anhydric compound however melts at no less than 172° C. When heating the monohydrate, strong discoloration will occur from 120°/130° C. up. From 175° C. up, an exothermal reaction is initiated, the molten mass being completely dehydrated and great amounts of gas developing which eventually lead to an explosion, the temperatures rising to far over 250° C.

It is known that metallic iron and copper and particularly their salts significantly reduce the decomposition temperature of NMMO, while the decomposition rate is simultaneously increased.

Moreover, additionally to the problems mentioned above, there is another difficulty, i.e. the thermal instability of the NMMO/cellulose solutions itself. This means that at the elevated processing temperatures (approximately 110°–120° C.), uncontrollable decomposition processes are initiated in the solutions which due to the development of gases may lead to strong deflagrations, fires and even explosions.

The industrial-scale production and processing of solutions of cellulose in an aqueous amine-oxide is performed in an industrial plant comprising parts which consist particularly of iron and steel, and wherein different components such as pipes, filter, pumps, ball valves and buffer tanks of iron or steel are used. Actually, all the components used may be characterized by the fact that within them the flow of the cellulose solution is influenced and thus in the case of highly viscous solutions, the solution usually has different flow rates in each of the components.

Certain components employed in a plant for the production of cellulose moulded bodies according to the amine-oxide process are characterized in that they comprise portions or areas whereat the flow rate of the cellulose even comes to a complete standstill. Portions having such statical flow conditions are referred to as dead zones.

Avoiding dead zones wherein the medium is subjected to a thermal load for a long time and degrades in the sense cited above, thus increasingly dissolving metals from instrumentation components, is an important requirement for operating the amine-oxide process under advanced safety conditions.

Particularly dangerous dead zones are those that allow the submission of degraded solutions, wherein due to corrosion processes occurred on component materials possibly already metals have accumulated, into the mainstream of the viscous, thermally unstable cellulose solution, when said component is mechanically moved. Thus it was found out for instance that into a very small gap existing between the piston and the case of a filter group which may be backwashed (FIG. 4a), a very small amount of cellulose solution may penetrate and may degrade completely.

Due to the close fit between moving components ("metal seals") intentionally provided in commercially available arrangements, as well as the high viscosity of the solution, the penetrating solution will exhibit a flow rate varying according to the degree of local fitting, which flow rate nevertheless as a whole will be very low. The solution will, during days and weeks at the temperatures existing in the component, suffer the degradation behaviour described above, while the reaction heat produced during the exothermal processes will be completely withdrawn, due to the small mass of the solution penetrated. The solution will degrade to such an extent that metal-containing coatings will gradually form which do not exhibit any more flow behaviour and may contain high percentages of iron, which may reach the magnitude of some % by mass, even when components of stainless steel are used.

When such degradation residues and coatings are present, the displacement of the piston necessary for backwashing the filter or changing the screen will imply the penetration of these dangerous residues into the system, which may lead e.g. to exothermal reaction in the product flow.

From EP-A - 0 652 098, a process for filtering a thermally unstable polymer molten mass which is to avoid dead zones is known. This is achieved by a process wherein the polymer molten mass is pumped from below into the pipes of a pipe bundle heat exchanger washed by a heat-carrying liquid, a filter cartridge forming an external annular gap being provided within each of the heat exchanger pipes, in such a way that the mainstream of the polymer molten mass is discharged after passing the cartridges and the side stream without passing the cartridges, at the top of the heat exchanger pipes, and that subsequently they are combined.

Technical means for avoiding dead zones have been described e.g. in WO 94/02408, wherein a sealing principle is employed to prevent the penetration of dope between moving container components.

BRIEF SUMMARY OF THE INVENTION

Since the procedure of sealing dead zones described is not workable for many components or is not appropriate in the long run, it is the object of the present invention to provide a process for transporting a solution of cellulose in an aqueous tertiary amine-oxide through a component wherein the cellulose has different flow rates within the components not comprising the problems mentioned above und thus allowing a safe transport of the cellulose solution.

The process according to the invention for transporting and processing a solution of cellulose in an aqueous tertiary amine-oxide through or within a component wherein the cellulose solution has different flow rates in the component, is characterized in that an outlet wherethrough part of the cellulose solution is discharged from that component is provided at a point within said component whereat the flow rate is relatively low.

BRIEF DESCRIPTION OF THE DRAWINGS

A preferred embodiment of the invention is illustrated in the appended drawings, in which.

DETAILED DESCRIPTION OF THE INVENTION

Figure 1:
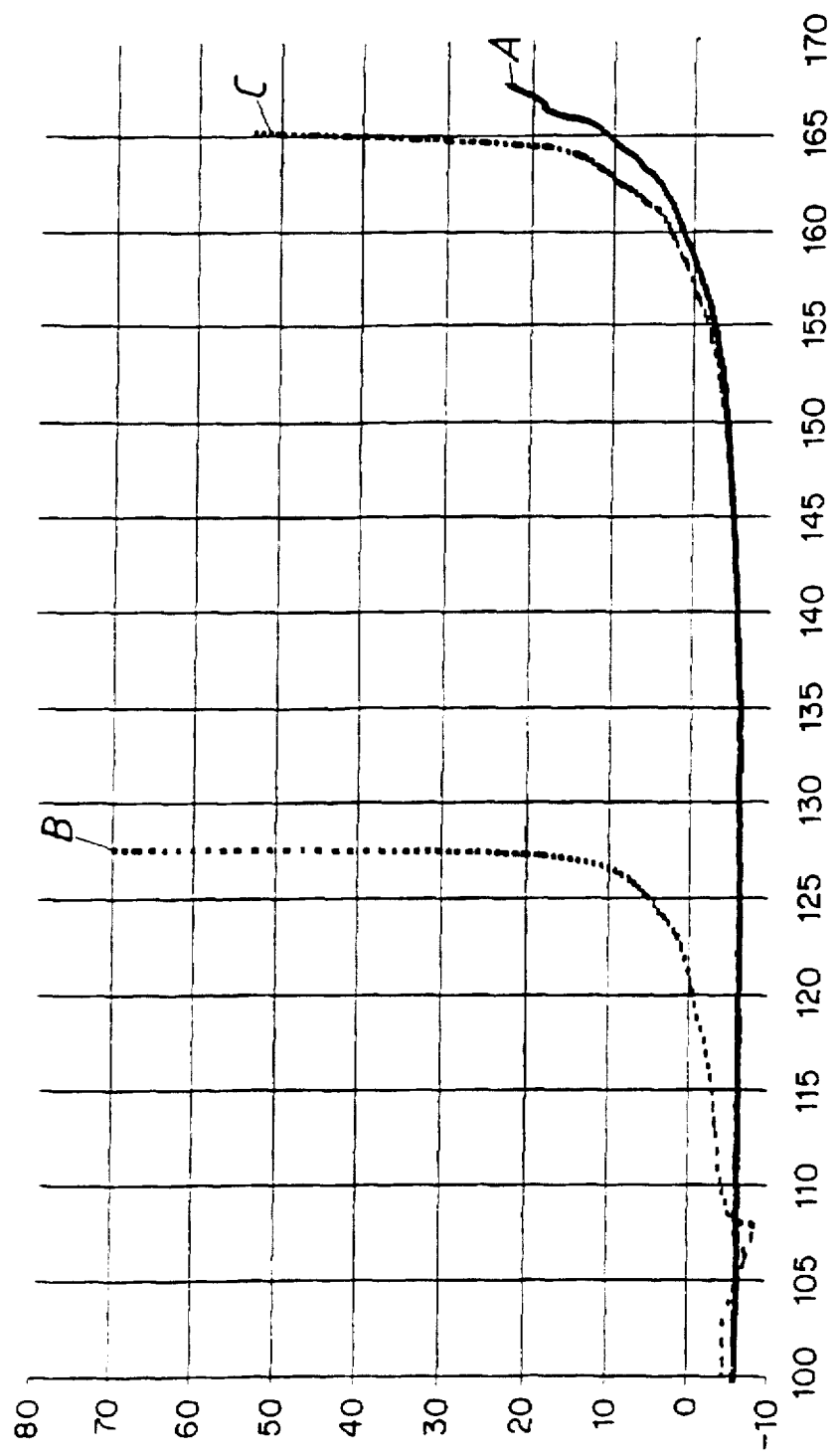
FIG. 1 is a graphical representation of temperature difference of intact dope versus a heating jacket as a function of heating jacket temperature, the control (A), control in combination with dope residue (B), and dope obtained from a leakage outlet in accordance with the invention (C)

The term "discharged from that component" means that this portion of the cellulose solution, branches from the mainstream and is no more combined with it.

Using the term "relatively small" the comparison of the flow rate of the cellulose solution to the mainstream which is transported through the component is meant. The invention is based on the finding that the problems caused by a degraded cellulose solution which adheres to metal surfaces in dead zones cannot be effectively solved by sealing the components used as completely as possible to avoid dead zones, as attempted in the state of the art, but that just on the contrary an outlet in a dead zone is to be provided wherefrom cellulose solution may be discharged and will not accumulate and decompose.

The outlet wherefrom cellulose solution may be discharged is for instance a hole, a gap or the like, appropriate to discharge cellulose solution under the operation conditions chosen.

Thus, by providing such an outlet according to the invention, it is prevented that dope accumulates and decomposes in the dead zones and that dope which is detached by the movement of components is introduced into intact product flows.

A preferred embodiment of the process according to the invention is characterized in that the outlet provided in the component is designed such that cellulose solution, mixed with transported cellulose solution and having, according to the thermal stability test described below, a rise temperature which is at most 10° C., particularly at most 5° C., below the rise temperature of the transported cellulose solution, may be discharged.

It has been shown that the thermal stability of the cellulose solution declines the more the longer it takes to be discharged through the outlet. Thus, the preferred embodiment of the process according to the invention mentioned above is to instruct those skilled in the art to provide the outlet for the cellulose solution in a suitable way. A method for testing thermal stability is indicated below.

In the process according to the invention, a filter, a flange, a pump, a valve, a backwash injector etc. may be provided as a component.

Further, the invention is concerned with an industrial plant for the production of a cellulose moulded body according to the amine-oxide process, which plant comprises at least one component wherethrough cellulose solution is transported, the cellulose solution having different flow rates within the component, which plant is characterized in that an outlet is provided wherethrough part of the cellulose solution is discharged from the component at a point whereat the flow rate is relatively low.

A preferred embodiment of the plant according to the invention is characterized in that the outlet provided in the component is designed such that cellulose solution, mixed with transported cellulose solution having, according to the thermal stability test described below, a rise temperature which is at most 10° C., particularly at most 5° C., below the rise temperature of the transported cellulose, may be discharged.

Thus it was found that a completely new procedure for the amine-oxide process consists in avoiding dead zones present in various components by providing appropriate outlets wherethrough the accumulating viscous cellulose solution may be discharged from the corresponding component. The outlet conveniently should be designed in such a way that the rate of product discharge is high enough so that the degradation the dope suffers in the component, depending on temperature and residence time, is not sufficient to significantly lower the thermal stability of the dope when a defined amount of dope discharged from that component is mixed with a defined amount of intact dope.

It has been shown that from the point of view of process safety an acceptable and economical situation is attained when in a test described below it can be shown that by an addition of 1% (based on intact dope) of a discharged dope to an intact dope, thermal stability is lowered less than 10° C., based on the value of the same intact dope without addition.

The term "intact dope" means the dope transported through the component in the mainstream.

By means of the following Examples, the invention will be described in still more detail.

Thermal stability test

1. Intact Dope (Control)

First, intact dope (composition: 15% of cellulose, 75% of NMMO, 10% of $H_2O$) in a solid, crystallized state was fine-ground in a laboratory mill.

The test was carried out in a Sikarex stove (TSC 512 type made by Systag), wherein 11.5 g of the sample prepared above were heated in a closed pressure vessel having a glass insert. As the temperature program, a step experiment of Standard Software was operated wherein heating was carried out very slowly (heating rate of 6° C./h) between two isothermal steps (1st step 90° C., 2nd step 180° C.). This resulted in the range of interest in a dynamical operation giving excellent reproducibility in regard to the exothermal phenomena. During this heating, the temperature difference between the temperature of the heating jacket (TM) and the temperature of the sample (TR) was continuously measured. The data measured were processed in a computer.

A representative result is illustrated in FIG. 1 as graph "A" (control), the abscissa showing the jacket temperature (from 100° C. on) and the ordinate showing the temperature difference (° C.) between the sample and the jacket (TR—TM). From graph A it may be seen that up to a jacket temperature of 150° C., evidently no exothermal reactions occur in the sample, since during heating up the temperature of the sample is constantly about 5° C. lower than the jacket temperature. This is the case in a normal heating-up process at the rate indicated above.

From a jacket temperature of approximately 150° C. on, graph A constantly is becoming steeper, which implies that the temperature of the sample increases at a higher rate than the temperature of the jacket. This ist due to an exothermal reaction in the sample. At a jacket temperature of 165° C., the temperature difference is already 10° C., i.e. the sample temperature is 175° C.

2. Residue from a Filtering Piston

Subsequently, the above test was repeated using a homogenous mixture of 11.5 g of the fine-ground dope mentioned above with 0.115 g (=1%) of a dope to be analyzed, present as a coating on a piston of a backwash filter of the state of the art according to FIG. 4b. The result is shown in FIG. 1 as graph "B".

From this graph it may be seen that exothermal reactions in the dope analyzed occur already from a temperature of about 120° C. on, which shows that the tested mixture is thermally much less stable than the intact dope (control graph "A").

3. Leakage Dope According to the Invention

Figure 4A:
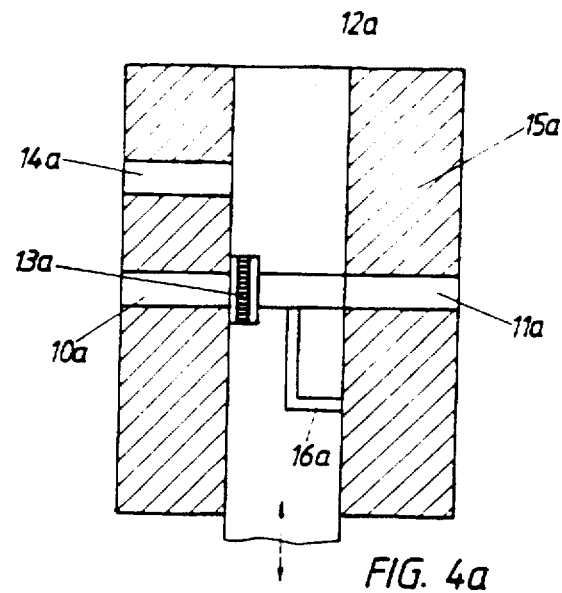
FIGS. 4(a) and 4(b) are a schematic representation of backwash filters in accordance with the invention
Figure 4B:
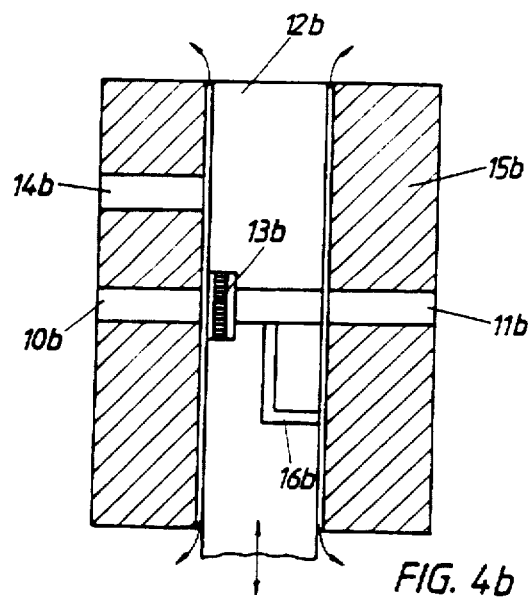

Finally, the test described in point 2 was repeated using leakage dope discharged from a gap of a filter according to FIG. 4b provided between the piston and the piston case. The result is shown in FIG. 1 as graph "C".

From this graph it may be seen that the dope analyzed is thermally significantly more stable than the coating formed in the state of the art. The dope analyzed even has a thermal stability only insignificantly lower than that of the intact dope (control graph "A").

4. Analysis of the Suitability of a Leaking Outlet

To test an outlet provided in a component according to the invention for its suitability in accordance of the object of the invention to discharge dope at a sufficiently high rate, first the thermal stability of the intact dope (see above, point 1) and thereafter the mixture of intact dope and 1% by mass (based on the intact dope) of leakage dope described above in point 3 is measured. In accordance with the object of the invention, the outlet provides sufficient process safety when the thermal stability of the mixture differs only slightly from the thermal stability of the intact dope. For the purposes of the present specification and claims, the so-called "rise temperature" is defined as a measure thereof. "Rise temperature" means the temperature of the jacket (program temperature) whereat, due to exothermal reactions, the temperature of the sample measured is 10° C. higher than the temperature of the heating jacket.

In accordance with the object of the present specification and claims, the thermal stability of the mixture is slightly different from the thermal stability of the intact dope only if the difference of the rise temperatures of intact dope and mixture is 10° C. at most.

For further illustration, this measuring principle is explained in more detail by means of FIG. 1.

First, graph A is established using intact dope according to the procedure indicated above. From graph A it may be seen that the intact dope has a rise temperature of approximately 165° C.

Thereafter, the mixture of intact dope and leakage dope to be tested is prepared and tested. Provided that graph C of FIG. 1 will result, the rise temperature of the homogenous mixture is about 163° C. This means that the difference of the rise temperatures is 2° C. (165–163) and that the outlet wherefrom the leakage dope was discharged is suitably designed in accordance with the object of the present invention, since the thermal stability of the mixture differs only insigificantly from that of the intact dope.

In the following, it will be schematically shown by means of FIGS. 2 to 4 how outlets wherethrough cellulose solution may be discharged may be provided according to the invention at known components. By means of FIGS. 5 and 6, a new backwash filter is shown whereat such outlets according to the invention are also provided. By means of FIGS. 7 to 9, the mode of operation of this backwash filter is described.

Figure 2A:
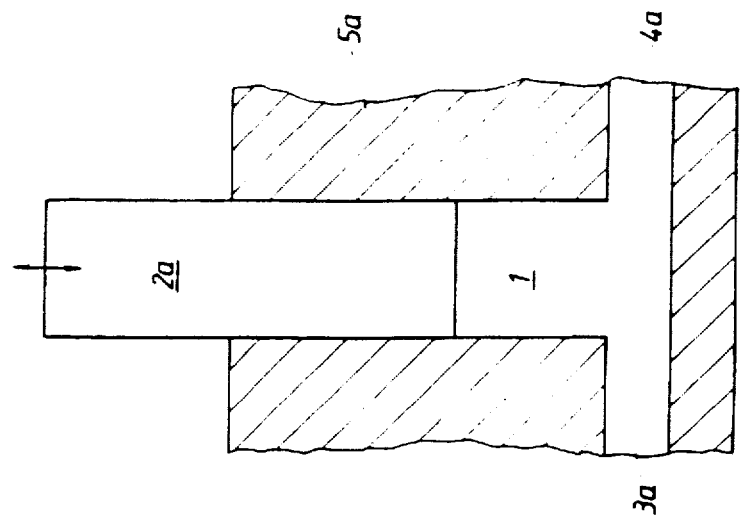
FIG. 2a is a schematic representation of a section of a prior art buffer device.
Figure 2B:
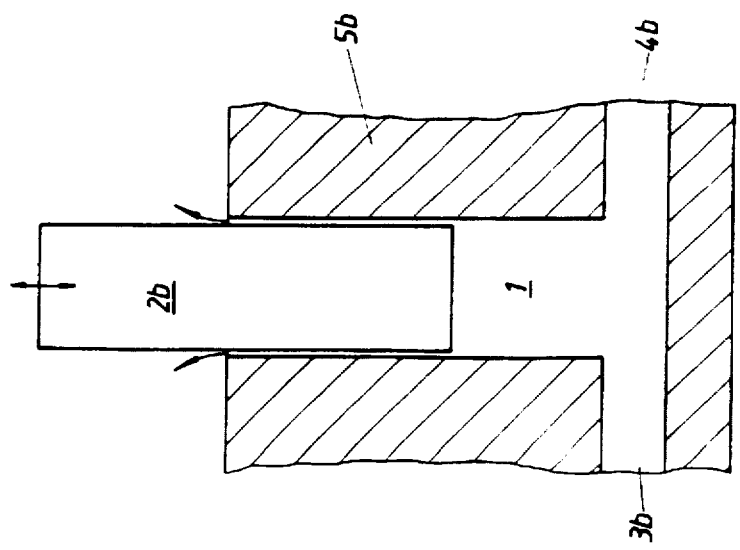
FIG. 2b is a schematic representation of a section of a buffer device according to the present invention.

FIGS. 2a and 2b each schematically show a section through a portion of a buffer device having a receptacle 1 for taking up dope, the size of receptacle 1 being adjustable by moving the cylindrical piston 2a and 2b respectively. Through inlet channel 3a and 3b respectively, dope flows into receptacle 1. Reference numbers 4a and 4b respectively refer to outlet channels. Reference numbers 5a and 5b respectively refer to the buffer case. In connection with backwash filters, such a buffer device also is referred to as backwash injector.

FIG. 2a illustrates a buffer device of the state of the art, wherein piston 2a fits perfectly, i.e. without leakage gap, into cylindrical receptacle 1. As experience shows however, a dead zone will be present between the piston surface and the wall of the cylindrical receptacle. When piston 2a moves, its surface will be coated with dope which degrades depending on temperature and residence time, while metal ions may be dissolved from the piston surface.

According to the invention, this problem may be prevented by providing a gap between piston 2b (FIG. 2b) and the cylindrical wall of receptacle 1 exhibiting a size sufficient so that—depending on the pressure existing in the receptacle and the viscosity of the dope—enough dope may be discharged in any of the operating positions of the piston, so that no dead zone will be formed and no dope may deposit at the piston, thus fulfilling the requirement of sufficient thermal stability described above. In FIG. 2b, the dope discharged is shown by means of arrows pointing diagonally upwards.

Figure 3:
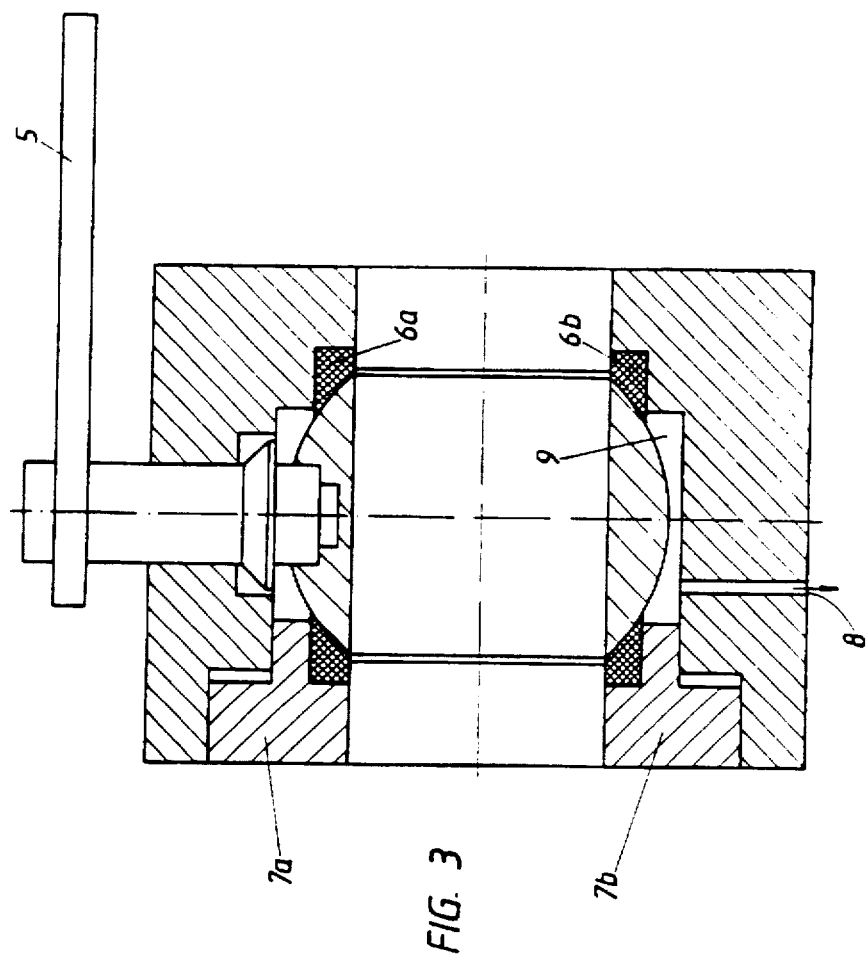
FIG. 3 is a schematic representation of a ball valve in accordance with the invention.

FIG. 3 shows a schematical section through a ball valve. Reference number 5 indicates a lever whereby the ball valve may be closed or opened. 6a and 6b denote sealing rings which may be adjusted by means of inserts 7a and 7b respectively. Reference number 8 refers to the leaking outlet provided according to the invention wherethrough dope present in container 9 of the ball valve may be discharged. The dope discharged from the ball valve is shown by means of an arrow pointing downwards. Also in this case it is evident that the dimensions of the leaking outlet have been suitably chosen when the dope discharged fulfils the condition regarding thermal stability indicated above.

FIG. 4 shows schematical sections through backwash filters. Reference numbers 10a and 10b respectively indicate inlet channels for the dope to be filtered, 11a and 11b respectively refer to the outlet channels, 12a and 12b respectively refer to the pistons including filters 13a and 13b respectively, and 14a and 14b respectively indicate the reject channels, 15a and 15b respectively denote the cases, and 16a and 16b respectively indicate reject holes.

For pistons 12a and 12b, in principle the explanations given for pistons 2a and 2b of FIGS. 2a and 2b respectively apply: only by providing a gap between the cylindrical wall of piston 12b and the inner wall of case 15b according to the invention, dope may be discharged and the formation of a coating at the piston wall, as it occurs in a backwash filter according to FIG. 4a, may be prevented.

Figure 5:
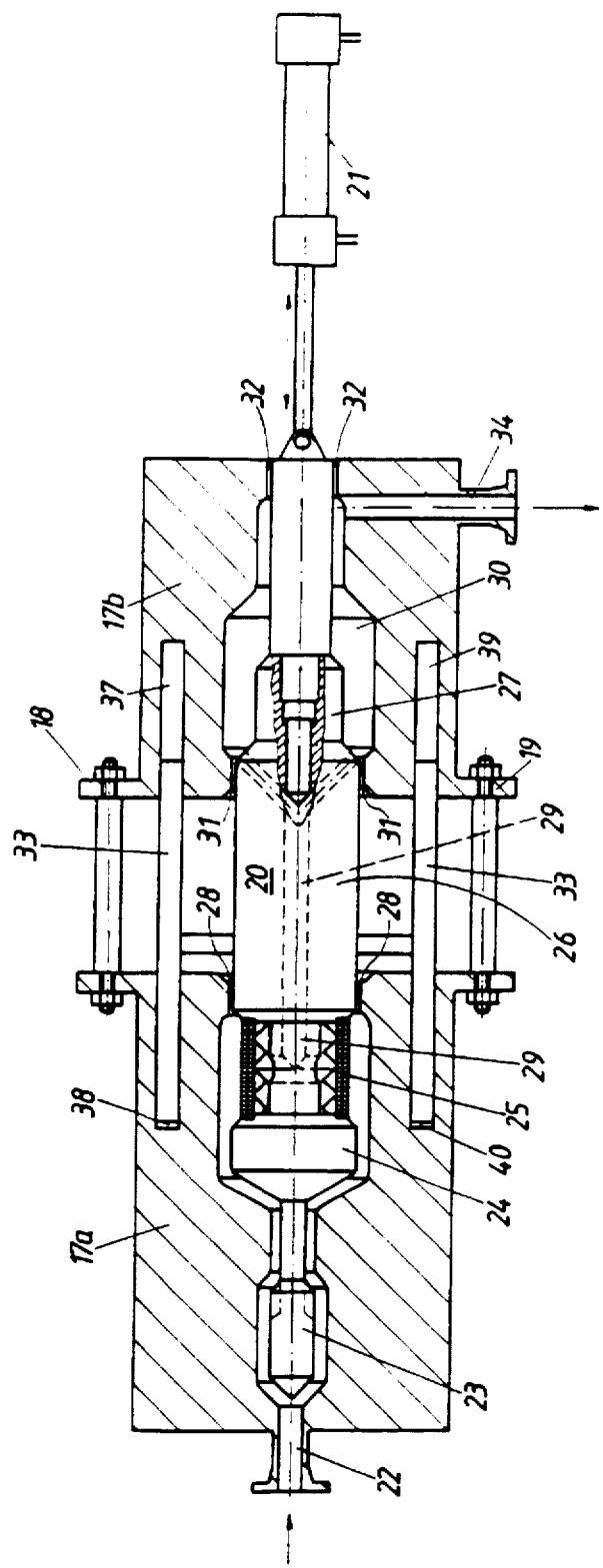
FIG. 5 illustrates an alternate embodiment of a backwash filter in accordance with the invention.

A section of a further backwash filter is shown schematically by means of FIG. 5. Reference numbers 17a and 17b refer to a case consisting of two parts, said parts being rigidly connected to each other by means of screw connections 18, 19, but having a clearance from each other. In case 17a, 17b, a piston 20 is movably provided. Piston 20 may be moved forwards and backwards by means of a device 21, this movement being indicated by means of a double arrow. By moving piston 20, it may be displaced into certain positions, thus allowing the operation of the backwash filter.

Piston 20 substantially consists of a front valve 23, a middle valve 24, a filter 25 provided subsequently to it, a valve body 26 and a back valve 27.

FIG. 5 shows the operating position of the backwash filter, i.e. the position of piston 20 wherein the viscous mass or the dope is filtered. The viscous mass or dope to be filtered is pressed into case 17a by means of inlet channel 22, washes the front and the middle valve 23 and 24 respectively and is pressed through filter 25, since valve body 20 seals against the case part 17a except for a small annular gap 28 provided according to the invention. By means of the annular gap 28 provided according to the invention, wherethrough continually small amounts of dope are discharged, no dope may collect at the sealing surfaces.

The mass or dope filtered through filter 25 is introduced into collecting channel 29 passing through valve body 26, and subsequently into filtration space 30 of the case part 17b wherein back valve 27 is located. Valve body 26 also seals case part 17b except for a small annular gap 31 provided according to the invention, whereby the accumulation of dope at valve body 26 is also prevented. The filtered dope is finally passed from filtration space 30 into outlet channel 34, wherefrom it is eventually discharged. Moreover, in case part 17b a further annular gap 32 fulfilling the same function as annular gaps 28 and 31 is provided.

It is evident to those skilled in the art that gaps 28, 31 and 32 are only able to maintain an annular shape when the piston is centrically arranged in case 17a, 17b. This may be achieved by means of motion rods 33 attached to valve body 20 and protruding into the corresponding channels 37, 38, 39, 40 within each of case parts 17a and 17b. These motion rods 33 follow each movement of piston 20. At the ends of channels 37, 38, 39, 40, small holes (not shown) are provided in case parts 17a, 17b to prevent the occurrence of an excess pressure or a reduced pressure in channels 37, 38, 39, 40 due to the movement of motion rod 33.

Figure 6:
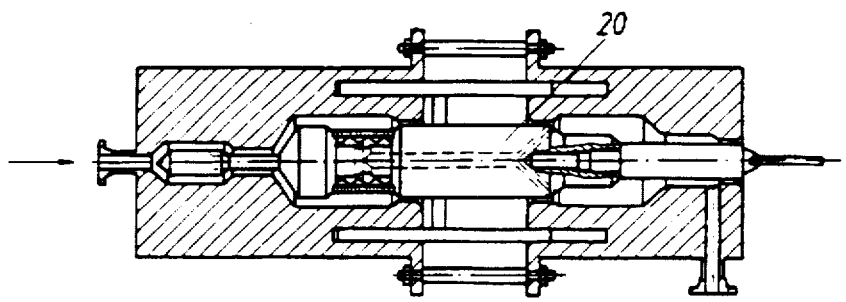
FIGS. 6, 7, 8 and 9 illustrate movement of the piston in the backwash filter illustrated in FIG. 5.
Figure 7:
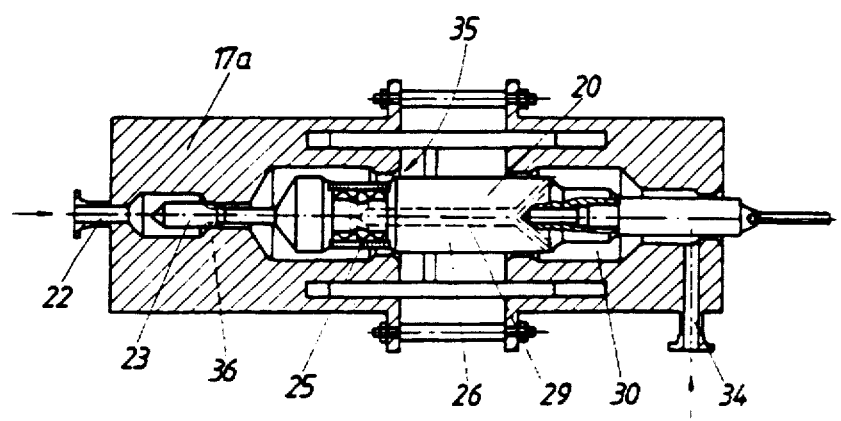
Figure 8:
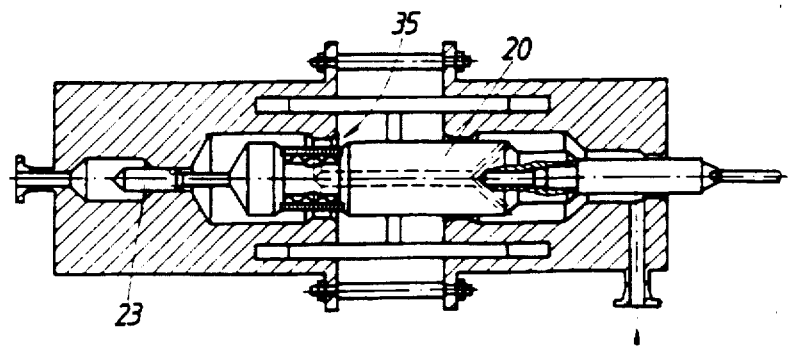
Figure 9:
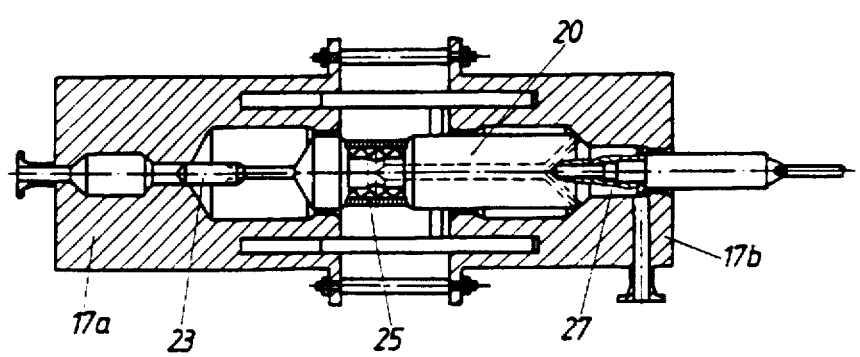

FIG. 6 shows the backwash filter shown in FIG. 5 on a reduced scale. Piston 20 is also in the filtrating position described already by means of FIG. 5. FIGS. 7 to 9 show the backwash filter shown in FIG. 6, piston 20 however occupying different positions. For the sake of clarity, in FIGS. 6–9 reference numbers were indicated only as far as they are necessary for understanding.

As already mentioned, FIG. 6 shows the backwash filter with piston 20 being in filtrating position. In FIG. 7, a slight movement to the right of piston 20 is shown, whereby valve body 26 no more seals against case part 17a. In this position, filter 25 may be backwashed. For this purpose, filtered dope is pressed through outlet channel 34 into filtration space 30. Subsequently, the dope is introduced through collecting channel 29 into the filter 25 to be washed and passes the filter, the impurities attached to the filter thus being detached. Through annular gap 35 created by the backward movement of piston 20, the backwashed dope is discharged.

During backwashing, it is not necessary to interrupt feeding of the dope introduced through inlet channel 22 into the backwash filter, since at front valve 23 recesses 36 are provided wherethrough dope may still be introduced to some extent into the filter. Due to the backwashing however, this dope fed does not pass the filter, but sweeps over the surface of the filter and is discharged also at outlet 35. Thus is it assured that all impurities which are detached from filter 25 during backwashing are discharged through outlet 35.

When piston 20 is drawn still further to the right, the position shown in FIG. 8 is attained. In this position, front valve 23 closes the feeding of dope so that only bachwashed dope is discharged through outlet 35, which is now bigger in comparison to FIG. 7.

In FIG. 9, piston 20 is located already so far to the right that back valve 27 closes case part 17b at the outlet side. Front valve 23 also closes with case part 17a. Filter 25 is now located between case parts 17a and 17b, so that it may be conveniently changed. Thus the position shown in FIG. 9 allows the change of filter 25.

It is evident to those skilled in the art that the present invention may be applied also to other components comprising dead zones.

We claim:

1. A process for transporting a solution of cellulose in an aqueous tertiary amine oxide through a component along a flow path comprising the steps of;

providing the cellulose solution to said component;

conveying the cellulose solution through said component whereby different portions of said cellulose solution have different flow rates along said flow path in said component;

providing for said component a discharge outlet for a portion of the cellulose solution flowing through said component at a location at which said portion of the cellulose solution is flowing through the component at a lower rate than another portion of said flow; and separately discharging said lower flow rate portion of said solution through said outlet while allowing said another portion of said cellulose solution to continue to flow along said flow path.

2. A process according to claim 1 wherein said outlet is located such that the portion of cellulose solution discharged from said outlet, in combination with the cellulose solution provided to said component exhibits a rise temperature of at most 10° below the rise temperature.

3. A process according to claim 1 wherein said outlet is located such that the portion of cellulose solution discharged from said outlet, in combination with the cellulose solution provided to said component exhibits a rise temperature of at most 5° below the rise temperature for the cellulose solution provided to said component.

4. A process according to claim 1, claim 2 or claim 3 wherein the component is selected from the group consisting of a filter, a pump, a valve, a flange and a backwash injector.

* * * * *